United States Patent [19]

Fukui

[11] Patent Number: 5,422,670
[45] Date of Patent: Jun. 6, 1995

[54] CONTROL CIRCUIT FOR A SOLID STATE IMAGING DEVICE WHICH ALLOWS A HIGH SPEED OBJECT TO BE DETECTED

[75] Inventor: Hiroshi Fukui, Kanagawa, Japan

[73] Assignee: Sony Corporation, Tokyo, Japan

[21] Appl. No.: 113,921

[22] Filed: Aug. 31, 1993

[30] Foreign Application Priority Data

Aug. 31, 1992 [JP] Japan .................................. 4-255967

[51] Int. Cl.6 .......................................... H04N 5/335
[52] U.S. Cl. ................................. 348/296; 348/297; 348/317
[58] Field of Search ............... 348/294, 296, 297, 298, 348/303, 311, 312; H04N 5/335

[56] References Cited

U.S. PATENT DOCUMENTS

| | | | |
|---|---|---|---|
| 4,780,764 | 10/1988 | Kinoshita et al. | 358/213.19 |
| 4,782,394 | 11/1988 | Hieda et al. | 358/213.19 |
| 4,907,089 | 3/1990 | Yamaguchi | 358/213.31 |
| 5,157,502 | 10/1992 | Nakajima et al. | |

Primary Examiner—Michael T. Razavi
Assistant Examiner—Ngoc-Yen Vu
Attorney, Agent, or Firm—Hill, Steadman & Simpson

[57] ABSTRACT

A solid-state imaging device for imaging an object moving at a high speed using a solid-state image sensor having an electronic shutter function. A modulated horizontal synchronizing signal, modulated so as to have a frequency higher than the frequency of the normal horizontal synchronizing signal depending on the designated shutter speed, is supplied from a modulated synchronizing signal generator to a timing generator. The timing generator counts a predetermined number of the modulated horizontal synchronizing signal pulses since the timing of a vertical synchronizing signal to output a readout pulse at a more prompt timing than when the normal horizontal synchronizing signal pulses are counted. The readout pulse controls the function of the electronic shutter of the solid-state imaging device. This enables the CCD image sensor to perform imaging by a high-speed shutter operation.

3 Claims, 6 Drawing Sheets

CONTROL CIRCUIT FOR A SOLID STATE IMAGING DEVICE WHICH ALLOWS A HIGH SPEED OBJECT TO BE DETECTED

BACKGROUND OF THE INVENTION

1. Field of the Invention

This invention relates to a solid-state imaging device advantageously employed for a camera unit mainly used for industrial purposes for imaging an object moving at a fast speed. More particularly, it relates to a solid-state imaging device enabling a high-speed shutter operation.

2. Description of the Related Art

The present Applicant has proposed in U.S. Pat. No. 5,157,502 a solid-state imaging device having an electronic shutter function of performing light exposure adjustment without employing an iris mechanism by controlling the electric charge storage time of a field storage type solid-state imaging device (CCD image sensor).

With the above solid-state imaging device, the electrical charges stored in the CCD image sensor are read out by a high-level picture readout pulse, shown in FIG. 1(b), outputted during a vertical blanking period (VBLK) in which a vertical blanking signal shown in FIG. 1(a) goes low. The charge storage time in the CCD image sensor is controlled by a reset pulse shown in FIG. 1(c), such that the electrical charges stored therein are drained in an overflow drain when the reset pulse is supplied thereto. Consequently, no electrical charges are stored in the CCD image sensor during the charge draining period, that is during the time period when the reset pulses are supplied. Therefore, electrical charges are stored in the CCD image sensor since the time the reset pulses cease to be supplied to the CCD image sensor, and the charge storage time in the CCD image sensor, that is the shutter speed, may be controlled by controlling the timing of cessation of the reset pulses.

The solid-state imaging device is particularly suited to the capturing of an object moving at a fast speed because the shutter speed can be varied responsive to the movement of the object by employing such electronic shutter function.

There is known a solid-state imaging device which is employed mainly for industrial purposes for imaging a moving object.

Such solid-state imaging device is arranged as shown for example in FIG. 2 in which, when an object 2 travelling on a path of movement 1 is moved past an imaging section 3, the object 2 is detected by a position sensor 4 which then outputs a low-level trigger pulse shown at timing t11 in FIG. 3(a) to a shutter pulse generator 5.

When supplied with the low-level trigger pulse, the shutter pulse generator 5 supplies a low-level shutter pulse to the CCD control circuit 6. That is, when supplied with the low-level trigger pulse, the shutter pulse generator 5 outputs a low-level shutter pulse at timing t11 shown in FIG. 3(b) to the CCD control circuit 6.

As long as the low-level shutter pulse is supplied, the CCD control circuit 6 supplies the reset pulses for draining the charges stored in the CCD image sensor 7. In this manner, as long as the reset pulses are supplied, imaging by the CCD image sensor 7 does not take place. However, if simultaneously the low-level trigger pulse is supplied, the CD control circuit 6 ceases to supply the reset pulses to the CCD image sensor 7, after supplying of the last trigger pulse. This initiates storage of electrical charges in the CCD image sensor 7.

The CCD control circuit 6 is supplied with the low-level vertical synchronizing signal shown between timing t11 and timing t12 in FIG. 3(c), and a horizontal synchronizing signal shown in FIG. 3(c), from synchronizing signal generator 8. When supplied with the above-mentioned shutter pulse, the CCD control circuit 6 supplies a high-level readout pulse, shown at timing t13 in FIG. 3(e), to the CCD image sensor 7, after counting e.g. nine pulses of the horizontal synchronizing signal shown in FIG. 3(d), since the decay of the vertical synchronizing signal shown in FIG. 3(c), and subsequently counting hundreds of clock pulses. In this manner, electrical charges are stored in the CCD image sensor 7 in an amount correlated with the imaging light radiated via an imaging lens 9 since the timing t11 when the shutter pulse is supplied to the CCD image sensor 7 until the timing t13 shown in FIG. 3(e) when the readout pulse is supplied to the CCD image sensor 7. The time period of t11–t13 represents a shutter speed.

Meanwhile, readout of the electrical charges from the CCD image sensor V is performed during a vertical blanking period which is the time period since timing t11 until timing t14 shown in FIG. 3(f).

The electrical charges read out from CCD image sensor 7 are supplied as imaging signal to an imaging signal processor 10. The imaging signal processor 10 performs signal processing, such as appendage of synchronizing signals, on the imaging signals, before outputting the processed signal at an output terminal 11. The imaging signal outputted at the output terminal 11 is supplied to e.g. a display screen of an analyzer. This enables the status of the object 2 to be analyzed in case the latter has been moved.

Since the solid-state imaging device, which effects imaging of a moving object, is employed mainly for industrial purposes, there are occasions wherein it is desired that the object 2 shown in FIG. 2 be moved at a fast speed and imaged by the high-speed shutter operation of e.g. a 10,000th of a second.

However, with the above-described solid-state imaging device, in which the readout pulse is supplied to the CCD image sensor after counting e.g. nine horizontal synchronizing pulses since the decay of the vertical synchronizing pulse and subsequently counting hundreds of clock pulses, the output timing of the readout pulse is pre-set on the basis of pixel array of the CCD image sensor employed in the solid-state imaging device.

The purpose of such arrangement is to prevent optical black pixels (OPB), provided for producing a reference black level at the lower end of the display screen of the analyzer, from being displayed at a deviated position at the lower end of the display screen by the readout pulse being outputted at a faster timing than the predetermined timing and the effective pixel being read out at a premature timing, as well as to prevent the OPB from being displayed at a deviated position at the upper end of the display screen by the readout pulse being outputted later than a predetermined timing and the effective pixel being read out at a retarded timing.

Thus it has not been possible with the above-described solid-state imaging device to shorten the shutter speed or charge storage time to less than the time period beginning at the decay of the vertical synchronizing signal and ending with the outputting of the readout-pulse. Consequently, it has not been possible with the conventional solid-state imaging device to perform imaging with a high-speed shutter operation of e.g. one millionth of a second.

OBJECTS AND SUMMARY OF THE INVENTION

It is therefore an object of the present invention to provide a solid-state imaging device whereby an object moving at a high speed may be imaged easily and clearly.

It is another object of the present invention to provide a solid-state imaging device whereby a high-speed shutter operation of e.g. one millionth of a second may be achieved.

In accordance with the present invention, the above objects may be accomplished by supplying a modulated horizontal synchronizing signal, modulated so as to achieve a frequency higher than that of the normal horizontal synchronizing signal, to readout pulse forming means, shortening the count time of pulses by the readout pulse forming means as compared to the count time of the normal horizontal synchronizing signal and expediting the supply timing of the readout pulse to said CCD image sensor.

The above and other objects of the present invention will become clear from the following description of the preferred embodiments and the claims.

DESCRIPTION OF THE PREFERRED EMBODIMENTS

Figure 1:
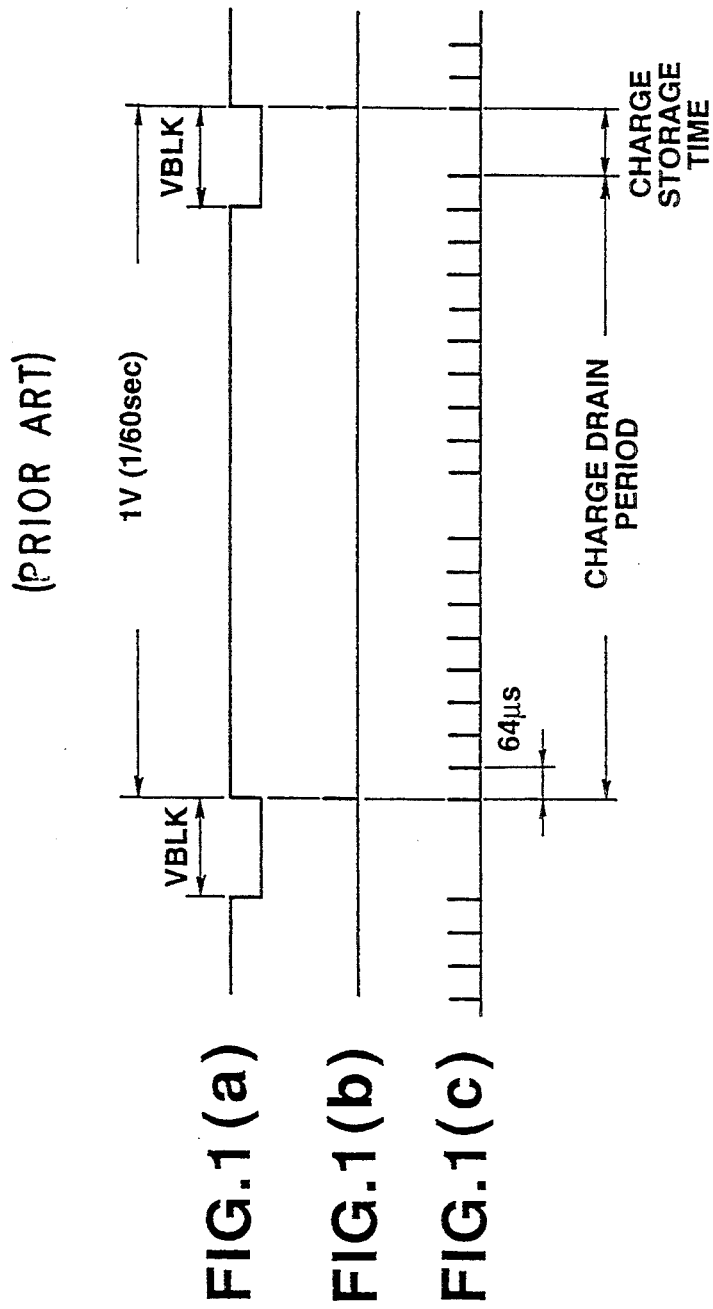
FIG. 1(a) to FIG. 1(c) is a timing chart for illustrating the operation of a conventional solid-state imaging device provided with an electronic shutter function.
Figure 2:
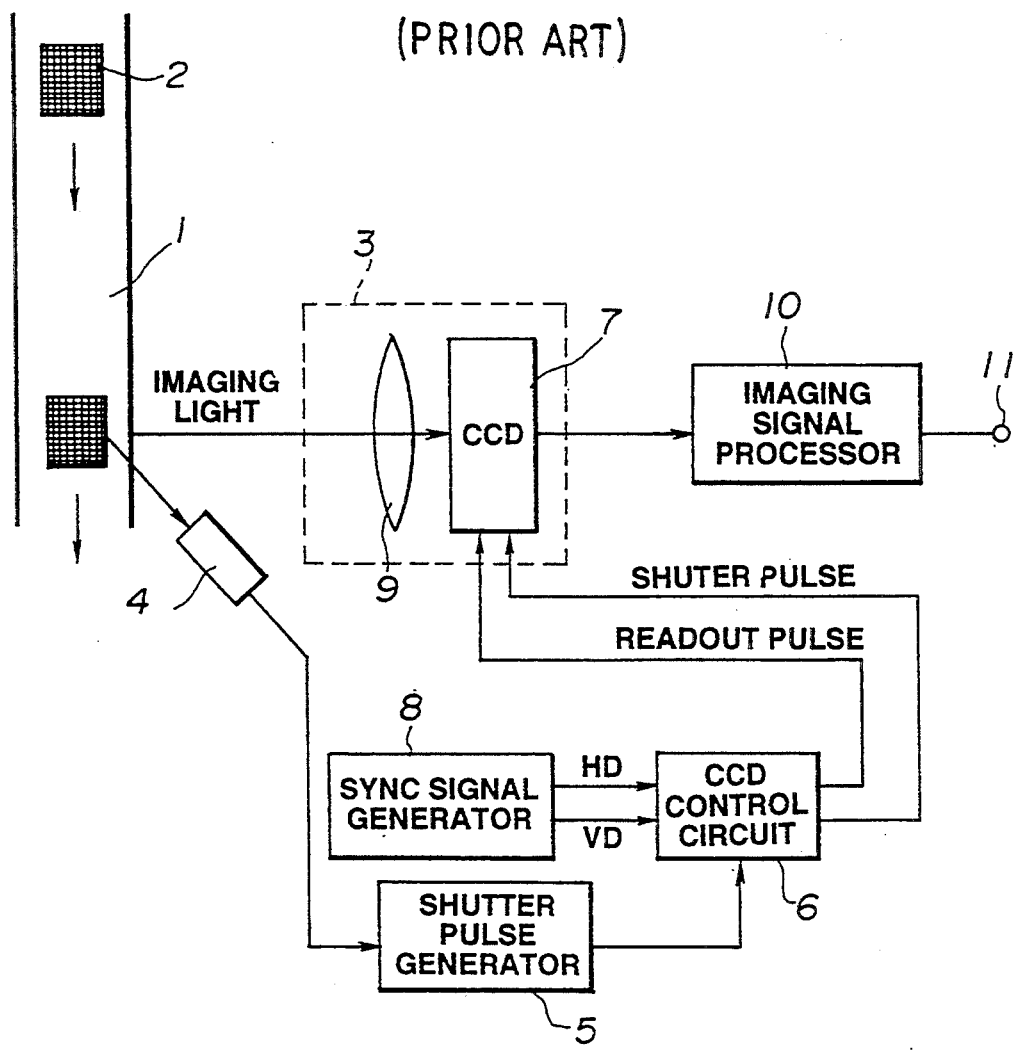
FIG. 2 is a block diagram of a conventional solid state imaging device.
Figure 3:
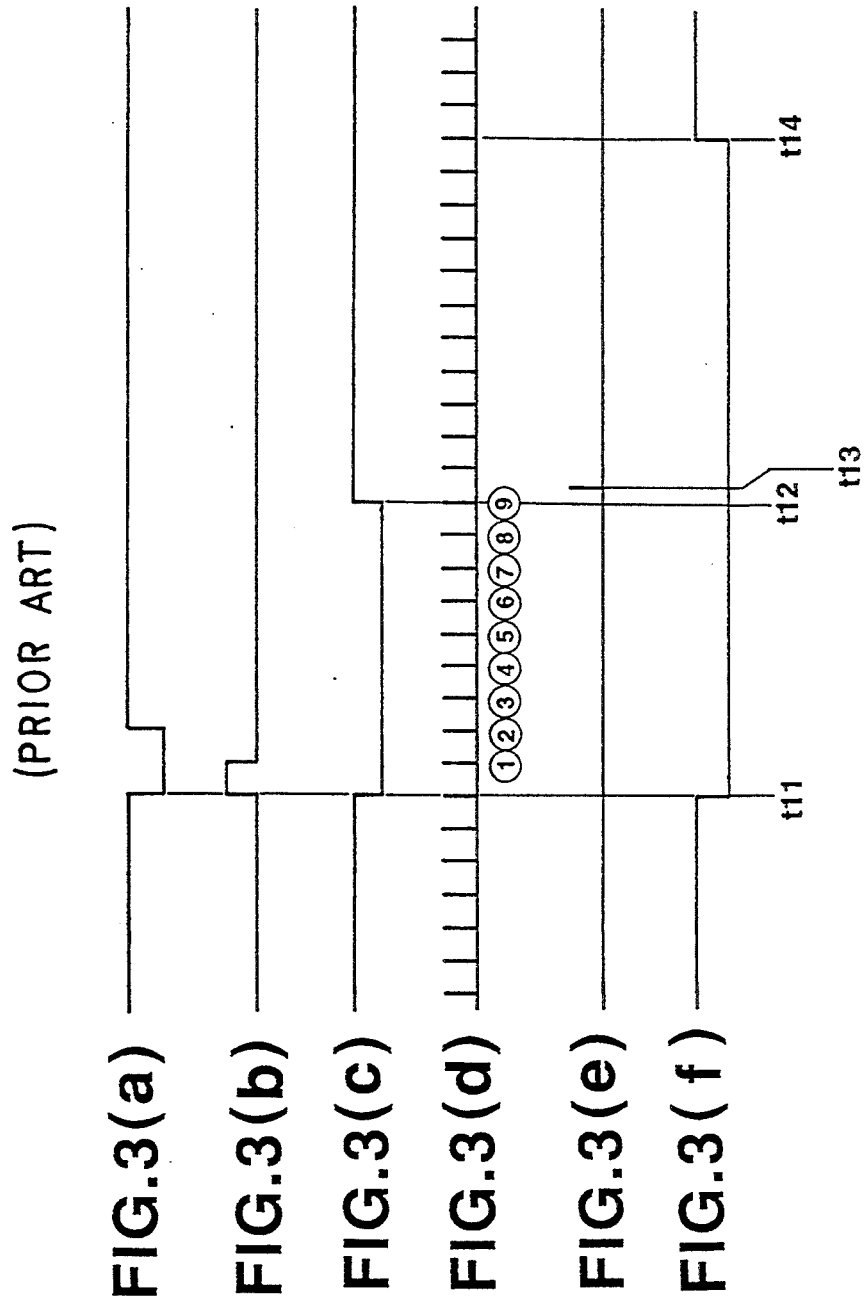
FIGS. 3(a)-3(f) is a timing chart for illustrating operation of FIG. 2.

Referring to the drawings, certain preferred embodiments of the solid-state imaging device according to the present invention will be explained in detail.

Figure 4:
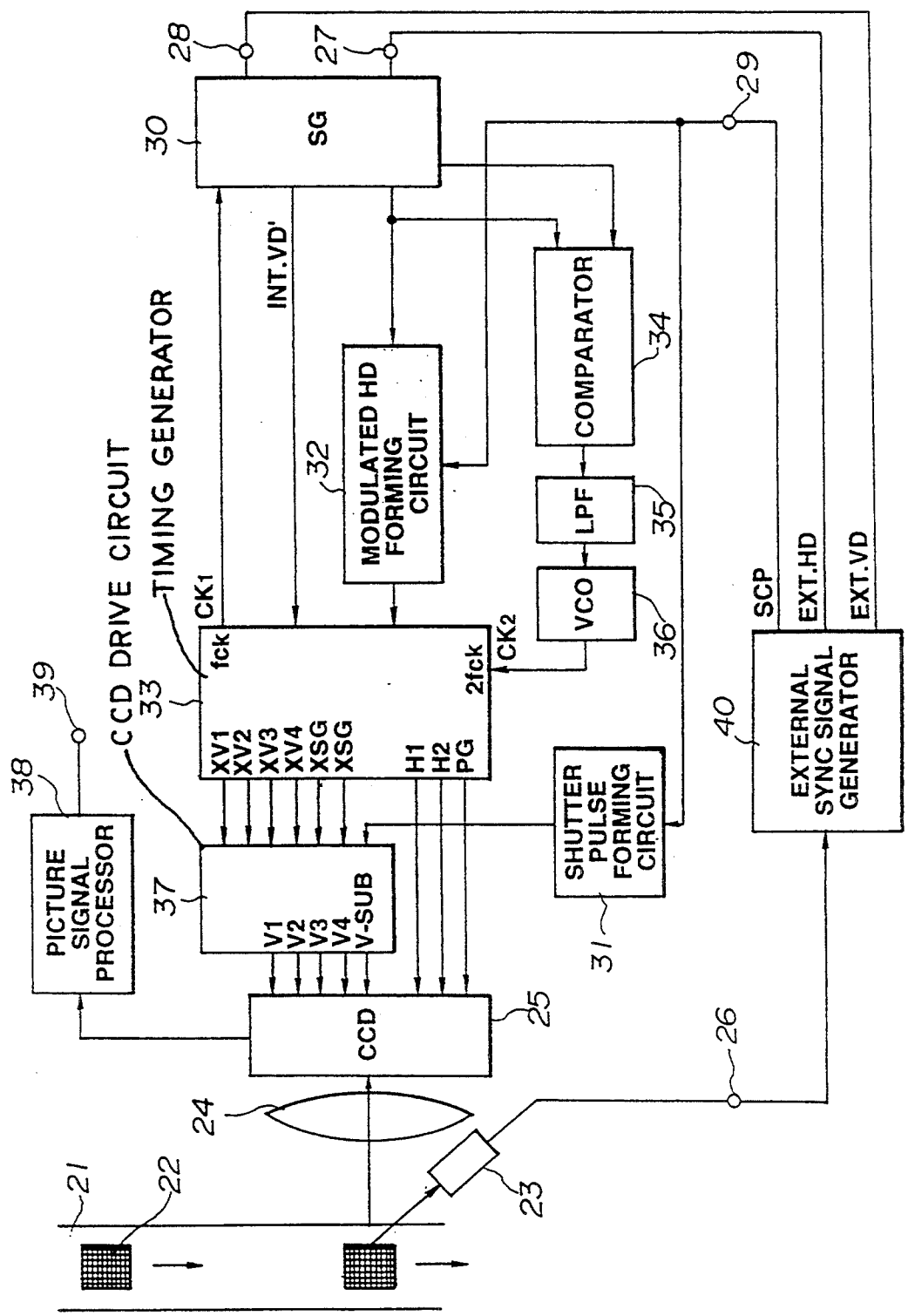
FIG. 4 is a block diagram showing an embodiment of the solid-state imaging device according to the present invention in which imaging is performed in synchronism with a trigger pulse supplied at a random timing.

The solid-state imaging device according to the present invention is arranged as shown for example in FIG. 4. Referring to FIG. 4, the present invention is applied to an industrial solid-state imaging device in which an object 22 being moved on a path of movement 21 is detected by a position sensor 23 and is imaged in synchronism with a trigger pulse produced as a position detection signal from the position sensor 23. The imaging device includes a CCD image sensor 25 for imaging the object 22 on the path of movement 21 by an imaging lens 24.

The solid-state imaging device has an electronic shutter function of controlling a-charge storage time of the CCD image sensor 25 beginning with the cessation of the supply of reset pulses for draining electrical charges stored in the CCD image sensor 25 and ending with the supply of a readout pulse of reading out stored charges to the CCD image sensor 25 by controlling the timing of the cessation of the supply of the reset pulses. The readout pulse is supplied to the CCD image sensor 25 after counting a predetermined number of horizontal synchronizing pulses since the time of supplying the vertical synchronizing signals.

A concrete arrangement includes an output terminal 26 for supplying a trigger pulse, obtained as a position detection signal by the position detector 23, to an external synchronizing signal generator 40, and input terminals 27 to 29 supplied with an external horizontal synchronizing pulses EXT HD and external vertical synchronizing pulses EXT VD and a shutter control pulse SCP, generated by the external synchronizing signal generator 40 in synchronism with the trigger pulse, respectively, as shown in FIG. 4.

The external horizontal synchronizing pulses EXT HD and external vertical synchronizing pulses EXT VD, generated by the external synchronizing signal generator 40 in synchronism with the trigger pulse, are supplied to a signal generator 30 via input terminals 27 and 28, respectively. On the other hand, the shutter control pulse SCP, generated by the external synchronizing signal generator 40 in synchronism with the trigger pulse, is supplied via input terminal 29 to a shutter pulse forming circuit 31 and to a modulated HD forming circuit 32.

The signal generator 30 functions as a synchronizing signal generating means in the solid-state imaging device according to the present invention, and is operated on the basis of clocks $CK_1$ ($f_{CK}$) supplied from timing generator 33, for adjusting the phase of the external horizontal synchronizing pulses EXT HD and external vertical synchronizing pulses EXT VD from the external synchronizing signal generator 40 to generate the internal horizontal synchronizing pulses INT HD and internal vertical synchronizing pulses INT VD'. Signal generator 30 supplies the internal vertical synchronizing signal INT VD' to the timing generator 33, while supplying the internal horizontal synchronizing signal INT HD to the modulated HD formulating circuit 32 and supplying the external horizontal synchronizing pulses EXT HD and internal horizontal synchronizing pulses INT HD to a phase comparator 34.

The shutter pulse forming circuit 31 functions as a shutter pulse forming means in the solid-state imaging device according to the present invention. When supplied with the shutter control pulse SCP, synchronized with the trigger pulse, from the external synchronizing pulse generator 40, the shutter pulse formulating circuit 31 forms a shutter pulse for terminating the supply of reset pulses for draining the charges stored in the CCD image sensor 25, and transmits the shutter pulse to a CCD driving circuit 37.

The modulated HD forming circuit 32 functions as a modulated horizontal synchronizing signal forming means in the solid-state imaging device according to the present invention. When supplied with the shutter control pulse SCP, synchronized with the trigger pulse, from the external synchronizing pulse generator 40, the modulated HD forming circuit 32 forms a modulated horizontal synchronizing signal MOD HD having a frequency higher than that of the internal horizontal synchronizing pulses INT HD to supply the modulated horizontal synchronizing signal MOD HD thus produced to the timing generator 33.

Besides, the phase comparator 34 phase-compares the external horizontal synchronizing pulses EXT HD and internal horizontal synchronizing signal INT HD to supply a phase comparison output conforming to the phase difference therebetween via a low-pass filter (LPF) 35 to a voltage-controlled oscillator (VCO) 36 as a control dc voltage. The VCO 36 is responsive to the control dc voltage from LPF 35 to form clock pulses $CK_2(2f_{CK})$ having a frequency twice the frequency of the clock pulse $CK_1(f_{CK})$ to supply the clock pulse $CK_2(2f_{CK})$ to timing generator 33.

Besides, the timing generator 33 is responsive to the clock pulses $CK_2(2f_{CK})$ supplied from VCO 36 to supply the clock pulse $CK_1(f_{CK})$ to the signal generator 30. Besides, the timing generator 33 is responsive to the internal vertical synchronizing signal INT VD' and to the modulated horizontal synchronizing signal MOD HD supplied from signal generator 30 to output readout pulses XV1 to XV4, XSG1, XSG2, H1, H2, PG etc. for reading out the charges stored in the CCD image sensor 25. It is noted that the timing generator 33 functions as readout pulse forming means in the solid-state imaging device according to the present invention, and generates readout pulses (sensor gate pulses $XSG_1$, $XSG_2$) by counting hundreds of clock pulses $CK_2(2f_{CK})$ after counting nine modulated horizontal synchronizing signal MOD HD from the leading edge of the internal vertical synchronizing signal INT VD'.

The CCD driving circuit 37 terminates the supply of the reset pulses for draining the charge stored in the CCD image sensor 25, responsive to the shutter pulse from the shutter pulse forming circuit 31, and drives the CCD image sensor 25, responsive to the readout pulse from the timing generator 33, for reading out the amount of the imaging charge of each pixel proportionate to the amount of the imaging light generated during an effective charge storage time during which the supply of the reset pulses is not made to a vertical transfer section at the timing of the sensor gate pulse $XSG_1$, $XSG_2$. The imaging charge thus read out is then outputted line-sequentially via a horizontal transfer section.

The imaging signal, which is the charge read out from the CCD image-sensor 25, is processed by imaging signal processor 38 with signal processing such as appendage of synchronizing signals, before being supplied via an output terminal 39 to an analyzer such as for picture analyses.

Figure 5:
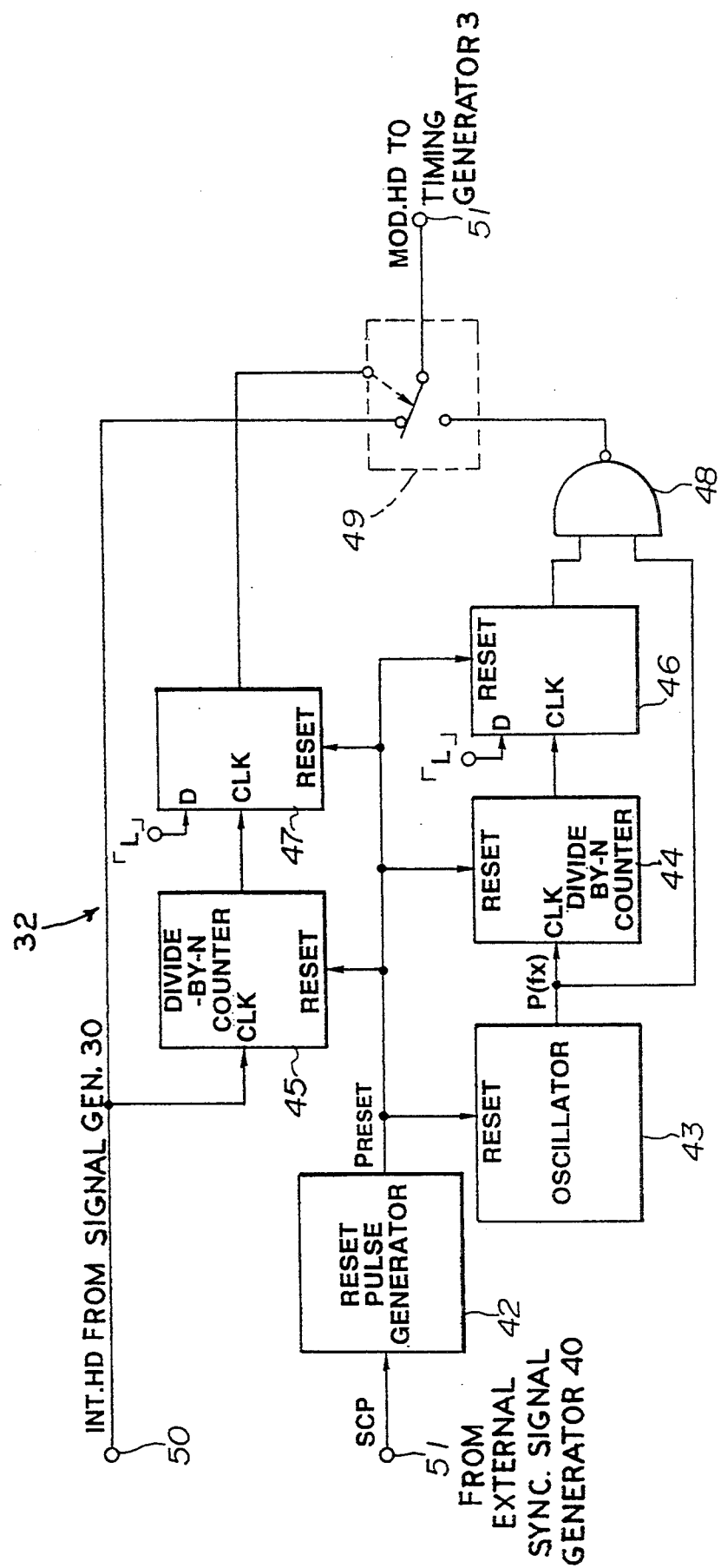
FIG. 5 is a circuit diagram of a modulated HD forming circuit provided at the solid-state imaging device shown in FIG. 4.

The modulated HD forming circuit 32 is constructed as shown for example in FIG. 5. The modulated HD forming circuit 32, shown in FIG. 5, comprises a reset pulse generator 42, supplied with the shutter control pulse SCP from the external synchronizing signal generator 40 via an input terminal 51, an oscillator 43 reset by a reset pulse $P_{reset}$ generated by reset pulse generator 42, first and second divide-by-N counters 44, 45, first and second D flip-flops 46, 47, a NAND gate 48 supplied with an oscillation output of the oscillator 43 and with a latch output from the first D flipflop 46, and a changeover switch 49 changed over by a latch output of the second D flip-flop 47. The modulated HD forming circuit 32 selects one of the internal horizontal synchronizing signal INT HD supplied via input terminal 50 from signal generator 30 and the gate output signal from the NAND gate circuit 48 by the changeover switch 49 to generate the modulated horizontal synchronizing signal MOD HD to supply the modulated horizontal synchronizing signal MOD HD thus generated to output terminal 51.

In the modulated HD forming circuit 32, the reset pulse generator 42 generates the reset pulse $P_{RESET}$, synchronized to the shutter control pulse SCP supplied via input terminal 51, to reset the oscillator 43, first and second divide-by-N counters 44, 45 and first and second D flip-flops 46, 47.

The oscillator 43 is a pulse generator reset by the reset pulse $P_{RESET}$ so as to be oscillated at a frequency fx higher than that of the internal horizontal synchronizing signal INT HD, and is adapted for supplying the pulse P(fx) of the frequency fx to a clock terminal of the first divide-by-N counter 44 and to the NAND gate 48. The oscillation frequency fx of the oscillator 43 is adapted for being controlled variably.

The first divide-by-N counter 44 is e.g. a divide-by-9 counter reset by the reset pulse $P_{RESET}$ to count the pulse P(fx) from oscillator 43, and supplies a carry output to the clock terminal of the first D flip-flop 46 each time nine pulses P(fx) are counted. The first D flip-flop 46 is reset by reset pulse $P_{RESET}$ to latch the logic "L" of its data terminal, using the carry output of the first divide-by-N counter 44 as a clock, for supplying to the NAND gate circuit 48 a latch output which goes high (logical "H") during a time period $T_A$ which elapses since it is reset by reset pulse $P_{RESET}$ until the first divide-by-N counter 44 counts the nine pulses P(fx). The NAND gate circuit 48 gates the pulse P(fx) from oscillator 43, using a latch output of the first D flip-flop 46 as a gate control signal to output the pulses P(fx) only during time period $T_A$ as its gate output signal.

The second divide-by-N counter 45 has its clock terminal supplied with the internal horizontal synchronizing signal INT HD from signal generator 30 via input terminal 50. The second divide-by-N counter 45 is a divide-by-9 counter reset by reset pulse $P_{RESET}$ to count the internal horizontal synchronizing signals INT HD. The counter 45 transmits a carry output to the clock terminal of the second D flip-flop 47 each time it has counted nine of the internal horizontal synchronizing signals INT HD. The second D flip-flop 47 is reset by reset pulse $P_{RESET}$ to latch the logic "L" at its data terminal, using the carry output of the second divide-by-N counter 45 as a clock, for supplying a latch output as a changeover control signal to the changeover switch 49. The latch output goes high during a time period $T_B$ which elapses since resetting by the reset pulse $P_{RESET}$ until counting of the nine internal horizontal synchronizing pulses INT HD by the second divide-by-N counter 45.

The changeover switch 49 is controlled as to its changeover operation by a latch output of the second D flip-flop 47 to select usually the internal horizontal synchronizing signal INT HD supplied thereto from signal generator 30 via input terminal 50, while selecting the gate output signal of the NAND gate 48 during the time period $T_B$. This generates the modulated horizontal synchronizing signal MOD HD consisting in the nine pulses P(fx) during the time period $T_A$ in substitution for the nine internal horizontal synchronizing pulses INT HD during the time period $T_B$. The modulated horizontal synchronizing signal MOD HD is outputted at an output terminal 51. The solid-state imaging device, having the above-described modulated HD formulating circuit 32, performs an imaging operation shown by a timing chart of FIG. 6, by being supplied from the synchronizing signal generator 40 with the external vertical synchronizing pulses EXT VD, external horizontal synchronizing signal EXT HD and shutter control pulse SCP, synchronized with the trigger pulse obtained on detection of the object 22 travelling on the path of movement 21 by the position sensor 23 located ahead of the CCD image sensor 25, #or imaging the object 22 travelling at a fast speed on the path of movement 21.

That is, the CCD image sensor 25 is driven by the CCD driving circuit 37, which is actuated by the readout pulse generated in the timing generator 37 in timed relation to the internal vertical synchronizing pulses INT VD' and internal horizontal synchronizing signal INT HD, generated by signal generator 30, for performing imaging by a high speed shutter operation having the time period since the trailing edge $t_a$ of the shutter pulse timed to the shutter control pulse SCP until the leading edge $t_b$ of the readout pulse (sensor gate pulse $XSG_1$, $XSG_2$) as an effective charge storage period $T_A$.

In this manner, an image of the object 22 moving on the path of movement 21 is displayed on the monitor device to permit analyses of the object.

Thus the time period since the decay of the internal vertical synchronizing pulses INT VD' until the start of counting of the modulated horizontal synchronizing signal MOD HD becomes constant, irrespective of the phase of generation of the internal vertical synchronizing pulses INT VD' relative to the trigger pulse. In this manner, the light exposure time, that is the effective charge storage period $T_A$, may be rendered constant to enable an image free of defects to be displayed on the monitoring device, even although the trigger pulse is generated at a random timing.

Besides, by providing an interval of not less than 1H before and after the output timing of the modulated horizontal synchronizing signal MOD HD, it becomes possible to prevent the OPB from being displayed at an offset position at the lower end of the display screen of the analyzer as a result of the readout pulse being outputted at an earlier time than a predetermined timing or the effective pixels being read out at a premature timing, as well as to prevent the OPB from being displayed at an offset position at the upper end of the display screen as a result of the readout pulse being outputted at a later time than a predetermined timing or the effective pixels being read out with delay.

On the other hand, since the modulated horizontal synchronizing signal MOD HD has the frequency fx higher than the usual frequency of the internal horizontal synchronizing signal INT HD, the modulated horizontal synchronizing signal MOD HD may be counted within a shorter time than when the internal horizontal synchronizing signal INT HD is counted by timing generator 33, so that the readout pulse may be outputted more promptly to enable a high speed shutter operation.

Figure 6:
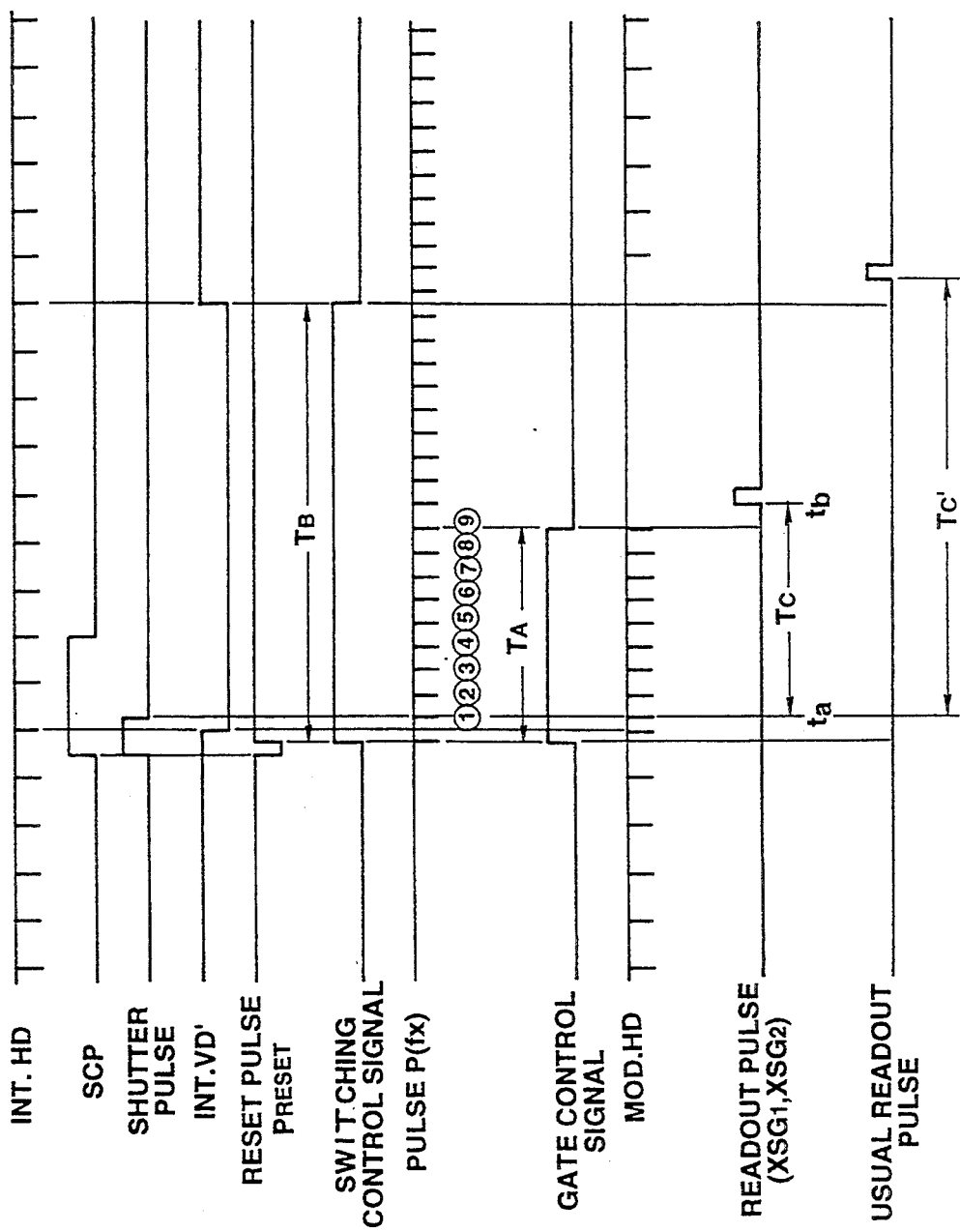
FIG. 6 is a timing chart for illustrating the operation of the solid-state imaging device shown in FIG. 4.

That is, if the readout pulse is generated by counting nine internal horizontal synchronizing signal pulses as from the leading edge of the internal vertical synchronizing signal INT VD' and subsequently counting hundreds of clock pulses $CK_2$ ($2f_{CK}$), the effective charge storage time $T_A$ becomes Tc' (about 9H) as shown in FIG. 6.

On the other hand, by changing the oscillation frequency of the oscillator 43 in the modulated HD formulating circuit 92 for changing the frequency during the period $T_A$ of the modulated horizontal synchronizing signal MOD HD, a desired shutter speed may be achieved.

Consequently, an object moving at a high speed may be imaged clearly and easily for use for industrial purposes.

Besides, the solid-state imaging device may be fabricated with a minimum change in the design of the conventional circuitry since it suffices to add the modulated HD forming circuit 92 to the conventional solid-state imaging device having the timing generator 33 for outputting a readout pulse by counting nine horizontal synchronizing pulses and subsequently counting hundreds of clock pulses.

It should be noted that the technical concept according to the present invention resides in a solid-state imaging device having an electronic shutter function and adapted for imaging an object in a timed relation to a trigger pulse supplied at random, in which, by providing modulated horizontal synchronizing signals having a frequency higher than the normal frequency of the horizontal synchronizing signals in lieu of the horizontal synchronizing signals, the counting operation of the timing generator may be brought to an end promptly to achieve a high-speed shutter operation.

The above-mentioned technical concept essentially consists in controlling the shutter speed by controlling the frequency of the modulated horizontal synchronizing signals. For this reason, various modifications may be made within the extent of the above-defined technical concept without limitation by the above-described exemplary circuit arrangement.

What is claimed is:

1. A solid-state imaging apparatus comprising:
   a solid-state imaging device having an electronic shutter function for controlling a charge storage time of said solid-state imaging device by controlling a supply of reset signals used for draining electrical charges stored in the solid-state imaging device, said charge storage time being a time since cessation of supply of said reset signal until supply of a readout signal used for reading out stored charges;
   signal generating means for generating an internal vertical synchronizing signal and an internal horizontal synchronizing signal in response to an external vertical synchronizing signal and an external horizontal synchronizing signal, said internal vertical synchronizing signal being reset when a shutter signal is supplied;
   modulated horizontal synchronizing signal forming means connected to said signal generating means and including modulated horizontal synchronizing signal generator for generating a modulated horizontal synchronizing signal having a frequency higher than that of said internal horizontal synchronizing signal, and a switch means selectively outputting said internal horizontal synchronizing signal and said modulated horizontal synchronizing signal, said switch means outputting said modulated horizontal synchronizing signal during a predetermined duration whose start time is defined by a supply timing of said shutter signal; and
   drive means for generating at least said reset signal and said read out signal on the basis of said internal vertical synchronizing signal and said internal horizontal synchronizing signal, said drive means including a readout signal generator which counts the internal horizontal synchronizing signal and the modulated horizontal synchronizing signal selectively supplied from said modulated horizontal synchronizing signal forming means from the timing of supply of the internal vertical synchronizing signal so as to form and supply said readout signal to said solid-state imaging device when the count value reaches a predetermined value, wherein said modulated horizontal synchronizing signal generating means comprises:

a reset pulse generator for generating reset pulses synchronized to said shutter signal;

an oscillator reset by the reset pulses from said reset pulse generator so as to be set into oscillation at a frequency higher than the frequency of the internal horizontal synchronizing signal;

gating means supplied with an oscillation output signal of said oscillator as a gate input;

gate control signal generating means having a first divide-by-N counter, said gate control signal generating means generating a gate control signal during a time interval from when said first divide-by-N counter is reset by said reset pulses from said reset pulse generator until N pulses from said oscillator are counted; and switching control signal generating means having a second divide-by-N counter, said second divide-by-N counter generating a switching control signal for causing said switching means to select the gate output of said gating means during a time interval from when said first divide-by-N counter is reset by reset pulses from said reset pulse generator until N horizontal synchronizing signals from said modulated horizontal signal forming means are counted.

2. The solid-state imaging apparatus according to claim 1, further comprising a shutter signal generating means for generating the shutter signal in response to a shutter control signal supplied from a position sensor for detecting that an object to be imaged is positioned in front of said solid-state imaging device.

3. The solid-state imaging apparatus according to claim 1, wherein said oscillator has a variable oscillation frequency.

* * * * *